(No Model.) 4 Sheets—Sheet 1.

R. H. PURNELL.
COTTON HARVESTER.

No. 405,049. Patented June 11, 1889.

WITNESSES:
Fred G. Dieterich
Edw. W. Byrn

INVENTOR
R. H. Purnell
BY
Munn & Co
ATTORNEY (No Model.) 4 Sheets—Sheet 3.

R. H. PURNELL.
COTTON HARVESTER.

No. 405,049. Patented June 11, 1889.

WITNESSES:
Fred G. Dieterich
Edw. W. Byrn

INVENTOR:
R. H. Purnell
BY Munn & Co
ATTORNEYS.

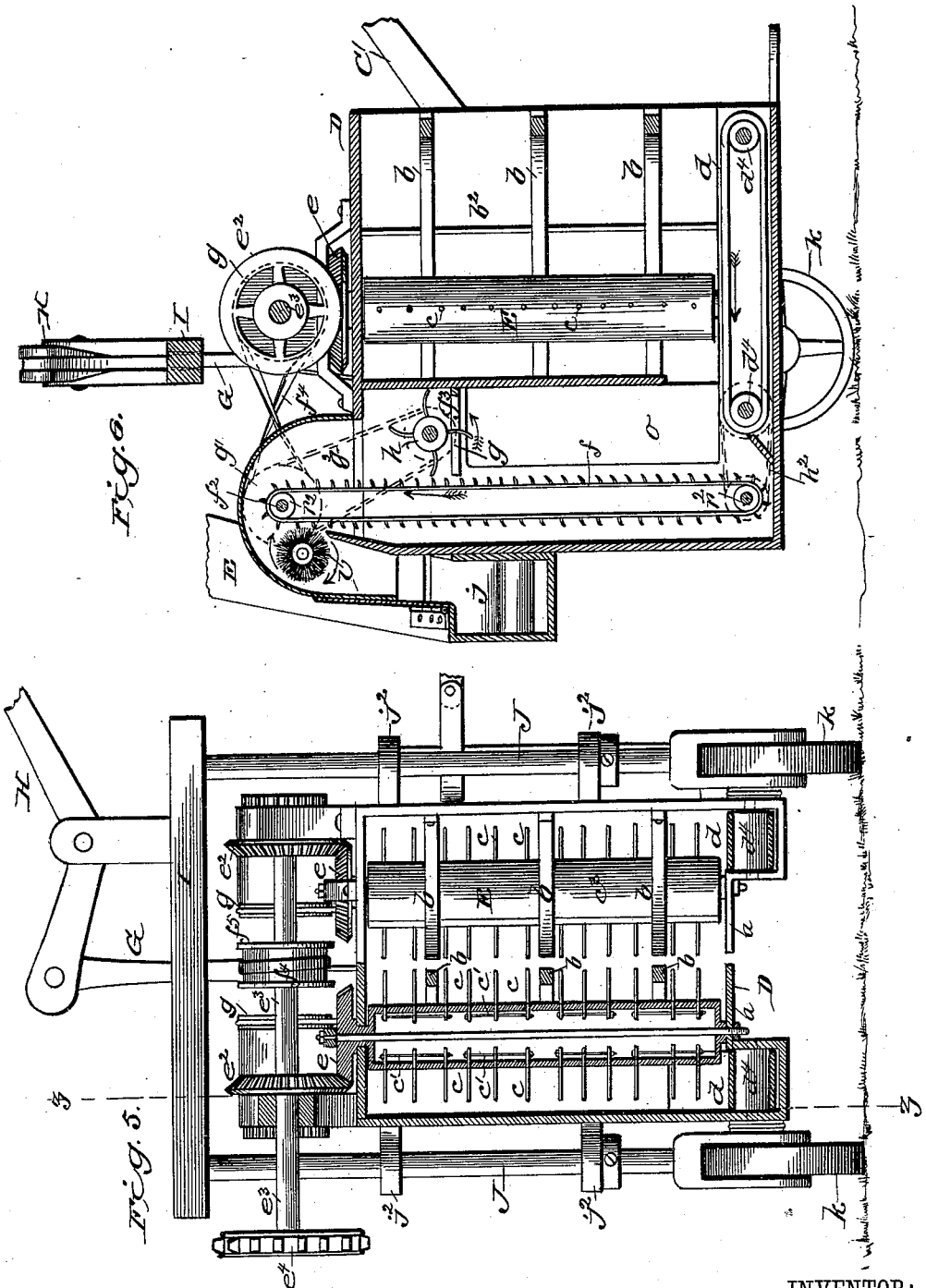

UNITED STATES PATENT OFFICE.

RICHARD HOPE PURNELL, OF ROSEDALE, ASSIGNOR OF ONE-HALF TO WILLIAM E. RINGO, OF MOUND LANDING, MISSISSIPPI.

COTTON-HARVESTER.

SPECIFICATION forming part of Letters Patent No. 405,049, dated June 11, 1889.

Application filed August 23, 1888. Serial No. 283,528. (No model.)

*To all whom it may concern:*

Be it known that I, RICHARD HOPE PURNELL, of Rosedale, in the county of Bolivar and State of Mississippi, have invented certain new and useful Improvements in Cotton-Harvesters, of which the following is a specification.

The object of my invention is to provide a harvester for picking cotton from the rows of plants in the field, which shall be of such construction that the team will not strike against and knock the cotton from the plants that have not yet been picked, thus saving the waste of a large portion of the cotton which would otherwise be trampled under foot.

It consists in the peculiar construction and arrangement of parts, which I will now proceed to fully describe with reference to the drawings, in which—

Figure 1:
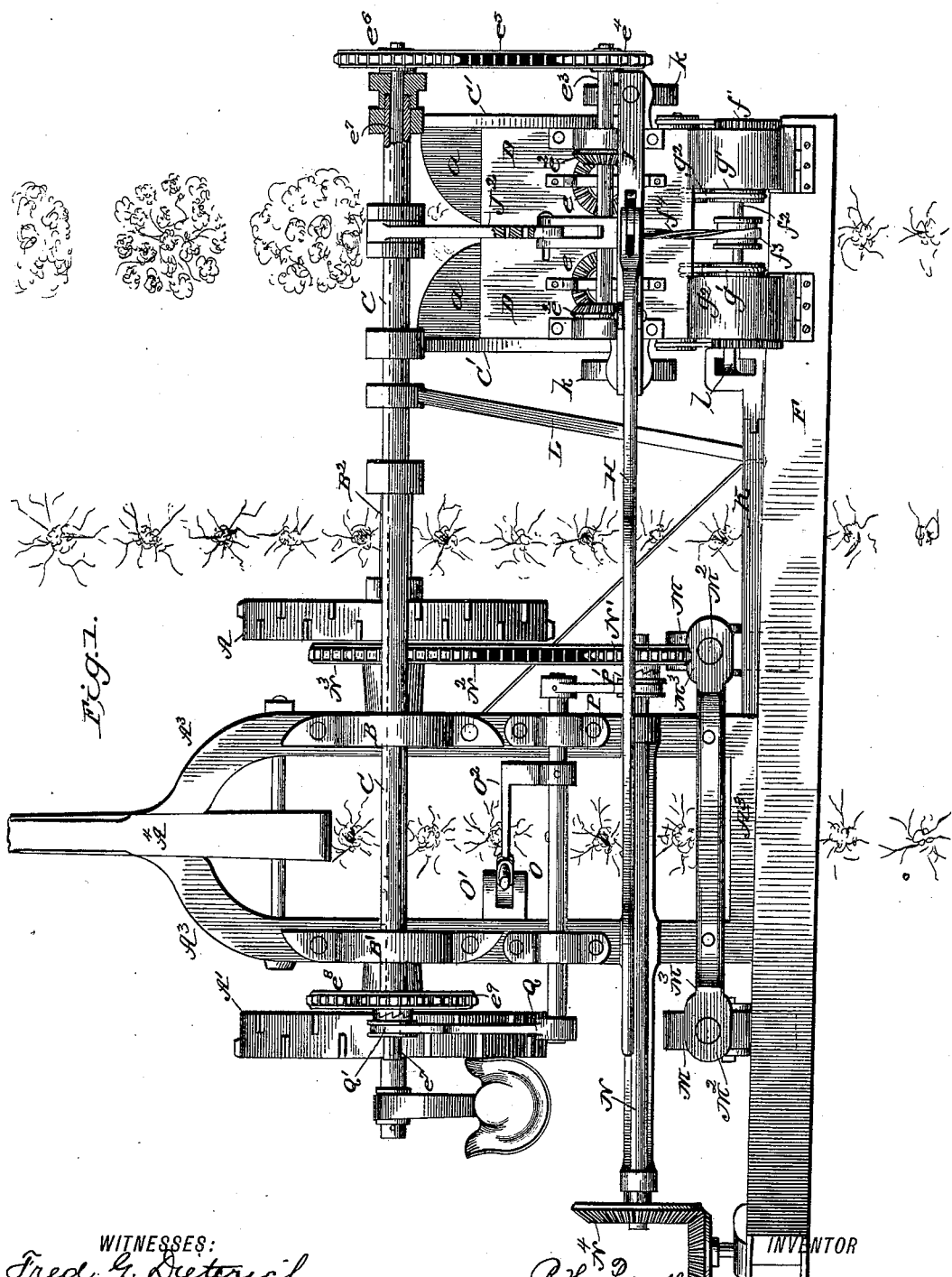
Figure 2:
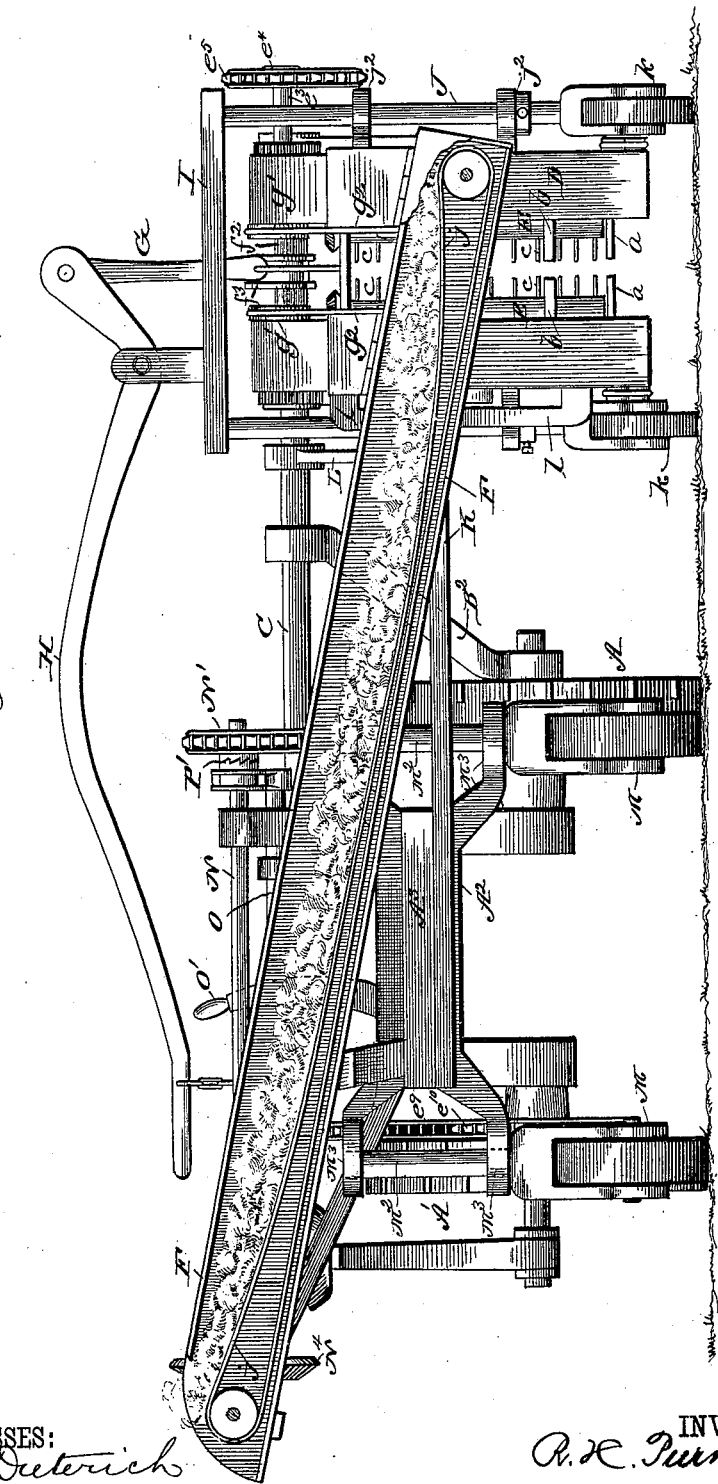

Figure 1 is a plan view of the harvester. Fig. 2 is a rear elevation with the side of the cotton-carrier removed. Fig. 3 is an end elevation of the picker-box. Fig. 4 is a horizontal section of the same taken on line $x\ x$ of Fig. 3. Fig. 4$^a$ is an enlarged horizontal cross-section of the picking-cylinder. Fig. 5 is a vertical section of the picker-box through line $y\ y$ of Fig. 4. Fig. 6 is a vertical section of the picker-box through line $z\ z$ of Fig. 5.

In the drawings, A A' are the two main supporting-wheels, which run upon the ground and serve to drive the working parts of the machine. These wheels revolve upon the ends of an upwardly-bent axle $A^2$, upon which is mounted a horizontal frame $A^3$, to which are attached the tongue $A^4$ and the draft-connection for the team.

The frame $A^3$ consists of two parallel bars connected at their rear ends, which frame is mounted in front upon the upper portion of the bent axle, and at the rear upon caster-wheels M, having vertical stems $M^2$, Fig. 2, turning in bearings in brackets $M^3$, attached to the main frame $A^3$.

Mounted upon the frame $A^3$ are two brackets B and B', and rising from one end of the crank-axle is an arm $B^2$, which two brackets and arm form three points of connection and rigid support for a hollow horizontal shaft C. This shaft is arranged at right angles to the tongue or line of draft, and is made long enough (see Fig. 1) to extend across three rows of plants—one row passing between the main wheels under the axle $A^3$, the next row just outside the inner wheel, and the third row near the outer end of said horizontal shaft.

Near the outer end of the hollow shaft are loosely attached the draft-arms C' C', Figs. 1 and 3, which are pivotally attached to and drag over the row of unpicked cotton a picking-box D. This box is made of two halves exactly alike, each of which has a curved guard $a$ at its lower front end, that form together a tapering inlet for the stalks of the plant. These two halves approach each other just close enough to leave a narrow channel between the two, through which the plants pass. The inside of each half-section has a series of curved guard-ribs $b$, Figs. 4, 5, and 6, which guard and retain the branches of the plant while the cotton is being picked.

Just inside the series of ribs on each side of the central channel-way there is a vertical rod $b^2$ and a cylinder armed with curved teeth $c$, which pick the cotton from the bolls and drop it upon a carrier-belt $d$ at the bottom of each half-section of the box. The rods $b^2$ prevent the branches from becoming entangled in the teeth of the cylinder. The teeth of these picking-cylinders are designed merely to knock the cotton out of the boll, and they pass between clearing-fingers $c^2$, Fig. 4, on the case. Said teeth are made of stout wire, bent, with the convex side forward. They each have a reduced shank, (see Fig. 4$^a$,) which is designed to be seated in a socket in one of the vertical bars of the cylinder, and said shank is perforated at its inner end, which passes through said cylinder-bar, and is designed to receive a locking-key $c'$, (Fig. 5,) which is long enough to pass through the holes in several teeth. By this construction the teeth when worn may be easily detached and replaced. Each cylinder has two vertical bars and rows of teeth, and the spaces between the bars are closed in by curved sheet-metal plates $c^3$, Fig. 4$^a$, which are screwed to place, and may be removed to give access to the inner ends of the teeth when they are to be removed.

To rotate these cylinders, they are each journaled upon a central vertical shaft in the picking-box, and on the upper end of each cylinder is fixed a bevel-wheel $e$, Fig. 5, which engages with a bevel-wheel $e^2$ on a shaft $e^3$, arranged in bearings upon the top of the picking-box. At the end of this shaft is a chain-wheel $e^4$, which, by means of a chain belt $e^5$, is geared to a second chain-wheel $e^6$ on the end of a horizontal shaft $e^7$, which extends through the hollow horizontal shaft C. This shaft $e^7$ at its other end has a gear-wheel $e^8$, Fig. 1, which, through a chain belt $e^9$, receives motion from a chain-wheel $e^{10}$, Fig. 2, on one of the main supporting-wheels.

The carrier-belts $d$ $d$, which are arranged in the bottom of the box, passing around the rollers $d^4$ $d^4$, arranged in front and rear of the cylinders and receiving the cotton as it is knocked out of the bolls, travel to the rear and deliver the cotton to vertically-arranged elevator-belts $f$ $f$, Fig. 6, which are armed with teeth. These elevator-belts travel in the rear sides of lateral openings $o$ in the picker-box, over rollers $r^2$ $r^2$ at the top and bottom of the picker-box, and as said belts raise the cotton to the main carrier F the hulls and large sticks fall out the side openings $o$ in the box, their dislodgment being facilitated by a grating $g$ of ribs and a revolving beater $h$, having spiked arms that thrash down the hulls which are caught by the grating and drive them away from the cotton lint which is being raised by the toothed elevator-belt. As the cotton is raised by the elevator-belts it is dislodged from its teeth by a rapidly-revolving brush $i$, located near the top of the elevator-belt on the rear side. This brush is driven by gear $s^2$ from gear $f^2$ on the upper roller of the elevator-belt, (see Fig. 3,) and the cotton is delivered upon a belt $j$ in the carrier box or trough F, which runs along the rear of the machine at right angles to the line of draft, and is designed to discharge into the wagon the picked cotton. The elevator-belts $f$ are driven by pulleys $g'$, Fig. 1, at their upper ends fixed to a shaft $f^2$, Fig. 2, which has near its middle a band-pulley $f^3$, that receives motion through a belt $f^4$ from a pulley $f^5$, Fig. 5, on the shaft $e^3$, that turns the picking-cylinders. The shaft $f^2$ has also attached to it two band-pulleys $g'$ $g'$, Figs. 1 and 2, which, through belts $g^2$ $g^2$, impart rapid motion to the beaters $h$ by connecting with small pulleys $g^3$ $g^3$, fixed on the ends of the beater-shafts, Fig. 6. Pulleys $h'$ $h'$, Figs. 3 and 4, are also fixed upon the ends of the roller-shafts at the lower ends of the elevator-belts, and these pulleys serve through belts $h^2$ $h^2$ to transmit motion to pulleys $h^3$ $h^3$ on the ends of the rear rollers of the carrier-belts at the bottom of the picker-box, thus imparting motion to these.

To adjust the picker-box higher or lower, it is suspended from a link-bar G, attached to the short arm of an elbow-lever H, the long arm of which extends to convenient reach from the driver's seat. This elbow-lever is fulcrumed upon a cross-head I, which has two legs J J, that descend through guides $j^2$ on the box and terminate below with wheels $k$, that travel upon the ground and give a bearing for the elbow-lever in raising or lowering the picker-box. This cross-head is connected to the hollow shaft in front by an arm $J^2$, Fig. 1, having a joint formed on the same by means of a row of holes and a bolt, which connection may be taken up or let out to compensate for the vertical adjustment of the box. As the picker-box is adjusted its draft-arms turn on the front hollow shaft, and a guide-bar $l$, Figs. 1 and 2, at the rear corner of the box slides up and down in a slot in the corner of a braced frame composed of bar K, attached to the running-gear at right angles to the line of draft, and bar L, connected with the hollow shaft parallel to the line of draft.

The rear end of the main frame is supported upon swiveling caster-wheels M M, and just in front of these and mounted upon journal-bearings on the main frame is a shaft N, Figs. 1 and 2, at one end of which is a chain-wheel N′, which through a chain $N^2$ derives motion from a chain-wheel $N^3$ on one of the main drive-wheels. At the opposite end of the shaft is a bevel gear-wheel $N^4$, which engages with a bevel gear-wheel $N^5$, fixed on the shaft of the roller that carries the belt $j$ of the main carrier-box F.

Just in front of the shaft N there is another shaft O, arranged to slide longitudinally in bearings by means of a hand-lever O′ and connecting-arm $O^2$. This shaft has at one end an arm P, that operates a clutch-coupling P′, which connects or disconnects the shaft N and wheel N′, and at the other end the shaft O has another arm Q, which operates a clutch-coupling Q′, that connects or disconnects the shaft $e^7$ and wheel $e^8$. One movement of the hand-lever breaks both the connection with driving mechanism of the picker devices and the other connects them again. By this means the picking devices may be thrown out of action when it is desired to transport the machine to or from the field.

In the construction of my harvester, one principal object has been to prevent the team from shaking and knocking out the ripe cotton, which would involve great waste, and to accomplish this the picking-box is made to operate at two rows distant from the team—i. e., there is between the team and the row of cotton being picked a row of picked plants, or, in other words, the machine covers and passes over three rows of plants—a picked row which occupies a position between the horses, a picked row which is between the team and the picking-box, and the unpicked row that enters the picking-box. By this means the unpicked plants are not jostled or shaken by the team and no loss of cotton is involved.

Having thus described my invention, what I claim as new, and desire to secure by Letters Patent, is—

1. The combination of a main frame and running-gear, a hollow shaft C, made of a length to extend transversely across three rows of plants, a driving-shaft arranged within the same and geared to one of the supporting-wheels, and a cotton-picking device supported on wheels and pivotally connected by draft-arms to the outer end of the hollow shaft, and having its operating parts connected to and worked by the driving-shaft within said hollow shaft, substantially as shown and described.

2. The combination, with the main frame and running-gear and the hollow shaft C, with a drive-shaft within it, of the picking-box supported on wheels and pivotally connected to the hollow shaft, and an adjusting-lever for raising and lowering the picking-box, and mechanism for operating the picker, substantially as shown and described.

3. The combination, with the main frame and running-gear, the hollow shaft C, with drive-shaft within it, a clutch-gear for connecting one of the supporting-wheels with said drive-shaft, a picking device supported on wheels and pivotally connected to the outer end of the hollow shaft and geared to and operated by the drive-shaft, a main cotton-carrier F, consisting of a trough or box with an endless belt having one end connected to the picking device and the other mounted upon the main frame, and a gearing with interposed clutch connecting the belt of its carrier to one of the main drive-wheels, substantially as shown and described.

4. The combination of the hollow shaft C, the picking-box D, made in two halves, the draft-arms C' C', connecting the box to the hollow shaft in a pivotal manner, the cross-head I, adjustable arm $J^2$, legs J J, with rollers at their lower ends, the guide-bar $l$ on the box, and the braced frame composed of bars K and L and the main frame $A^3$, substantially as and for the purpose described.

5. The combination, with the picker-box D, made in two halves, with curved pieces $a\ a$, guard-ribs $b$, teeth $c^2$, and rod $b^2$, of the horizontal belts $d\ d$, arranged in the bottom on each side, the vertical picker-cylinder E, with teeth $c$, the elevator-belt $f$, the grating $g$, and beater $h$, substantially as shown and described.

6. The combination of a pair of vertical picking-cylinders, a pair of horizontal belts to receive the cotton, located at the bottom of the picking-cylinders, a pair of toothed elevator-belts arranged vertically at the rear ends of the horizontal belts, a beater for driving down the hulls and sticks, and a revolving brush arranged upon the opposite side of the elevator-belt, substantially as and for the purpose described.

7. The combination, in a cotton-harvester, of the frame having the running-gear, the hollow shaft C, supported thereon, the picking-box arranged at the outer end of the shaft, a revolving shaft extending through the hollow shaft and operating the picker devices, and a cotton-carrier consisting of a trough or box F, with a belt in it connected at one end to the picker-box and at the other to the running-gear and arranged transversely to the line of draft, as described.

8. The combination, with the hollow shaft C and the inner drive-shaft $e^7$, of the picking-box D, mounted upon wheels, the draft-arms C' C', pivotally connecting the same to the hollow shaft, a sliding frame connected to the wheels for adjusting the box vertically, the braced frame K L, and the guide $l$, substantially as shown and described.

RICHARD HOPE PURNELL.

Witnesses:
SOLON C. KEMON,
CHAS. E. BROCK.